United States Patent [19]

Koch et al.

[11] 4,299,323

[45] Nov. 10, 1981

[54] HELICAL STORAGE AND CONVEYING UNIT

[75] Inventors: Richard L. Koch, Mt. Clemens; Walter H. VanDeberg, Berkley, both of Mich.

[73] Assignee: F. Jos. Lamb Company, Warren, Mich.

[21] Appl. No.: 92,477

[22] Filed: Nov. 8, 1979

[51] Int. Cl.$^3$ .................... B65G 25/00; B65G 13/02
[52] U.S. Cl. .................................. 198/774; 198/778
[58] Field of Search ............... 198/774, 775, 776, 778, 198/736, 747, 750, 755–756, 772

[56] References Cited

U.S. PATENT DOCUMENTS 3,667,591  6/1972  Sykes ................................ 198/756
4,026,409  5/1977  Stockdale ........................ 198/778

Primary Examiner—Robert B. Reeves
Assistant Examiner—Brian Bond
Attorney, Agent, or Firm—Barnes, Kisselle, Raisch & Choate

[57] ABSTRACT

A storage and conveying unit having two helically shaped guideways on which workpieces are adapted to be supported in a position inclined slightly to the vertical. One of the guideways is mounted on an outer cylindrical support and the other guideway is mounted on an inner cylindrical support. The guideways are parallel and uniformly spaced apart in a direction axially of the storage unit. The inner cylindrical support is reciprocated in a helical path parallel to the helical inclination of the guideways to advance the workpieces in the direction of their inclination.

7 Claims, 7 Drawing Figures

HELICAL STORAGE AND CONVEYING UNIT

This invention relates to helical storage and conveying units for workpieces, and, more particularly, to workpiece storage units having two vertically spaced, helically shaped guideways on which workpieces are supported, one of the guideways being stationary and the other being powered to oscillate to thereby advance the workpieces upwardly or downwardly in a helical path.

Storage units of the type described are commonly used in industry for accommodating a supply of workpieces between successive machines which perform processing operations on the workpieces. Normally in such storage units the convolutions of the stationary guideway are supported on a stationary circular outer structure. The successive convolutions of the vertically oscillating guideway are disposed below and in vertical alignment with the successive convolutions of the stationary guideway and are supported by radial spokelike members attached to a vertically extending shaft at the center of the circular structure, the shaft being reciprocated vertically by suitable means. The stationary guideway normally consists of two rails arranged to partially support the underside of an enlarged top portion of the workpiece and the oscillating guideway is arranged to engage and partially support the smaller lower end of the workpiece. The two sets of guideways are spaced apart vertically in relation to the size of the workpiece such that when the workpiece is supported by the two guideways it assumes an attitude inclined slightly to the vertical. Thus, when the central shaft is raised to lift the lower guideway, the enlarged upper end portion of the workpiece will slide along the top stationary guideway and the angle of its attitude will be increased. When the central shaft is lowered, the lower portion of the workpiece will slide along the bottom guideway until the workpiece again assumes it original angle of inclination. Thus, during one cycle of oscillation the workpiece is advanced one increment along both guideways in the direction of its inclination. It will be noted that the conveyed part will travel in either direction depending on the direction of its inclination. Thus, when the guideways extend helically, the workpiece flow can be arranged to be either up or down in a helical path.

By necessity the magnitude of vertical oscillation is limited by the length of the inclined workpiece and the degree of its inclination. Thus, with many workpieces the magnitude of vertical oscillation is necessarily relatively small and, as a consequence, the forward progress of the workpiece is also relatively small. Thus, in many instances the continuous vertical oscillation of one of the guideways will not deliver an adequate supply to satisfy the requirements of the associated manufacturing operations.

One attempt at solving this problem of an inadequate delivery rate has been to angularly oscillate one of the guideways relative to the other to obtain a longer stroke and, thus, deliver more workpieces. Since the guideways are mounted helically around the storage unit in axially spaced, parallel relation, any angular motion of one guideway relative to the other about the axis of the unit will cause the axial spacing of the guideways relative to one another to change. Inasmuch as the axial spacing between the guideways is determined to a large extent by the size of the workpiece and is critical within certain limits, the maximum angular stroke is limited and the workpiece delivery rate of the unit is likewise limited.

The primary object of this invention is to provide a helical storage unit which is adapted to deliver workpieces at a relatively rapid rate, regardless of the size of the workpieces.

A further object of the invention is to provide a helical storage unit wherein one of the guideways is oscillated both vertically and angularly relative to the other for advancing the workpieces along the guideways.

More specifically, in the present invention the movable guideway and its associated assembly of the storage unit are supported by wedges which are in turn supported on rollers that are journalled on the fixed portion of the unit. The angles of the wedges are substantially equal to the helical angle of the guideways. When angular oscillations are imparted to the movable structure through the action of the wedges a helical oscillation is produced and the movable guideway is displaced in a path parallel to the helical angle of both guideways. Since the distance between the fixed and movable guideways remains constant, the stroke of the oscillation is not limited and can be adjusted to deliver the required amount of workpieces.

It is an object of this invention to provide a storage unit that will receive and deliver workpieces at adequate rates to satisfy the demands of high production.

Other objects, features and advantages of the present invention will become apparent from the following description and accompanying drawings, in which.

Figure 1:
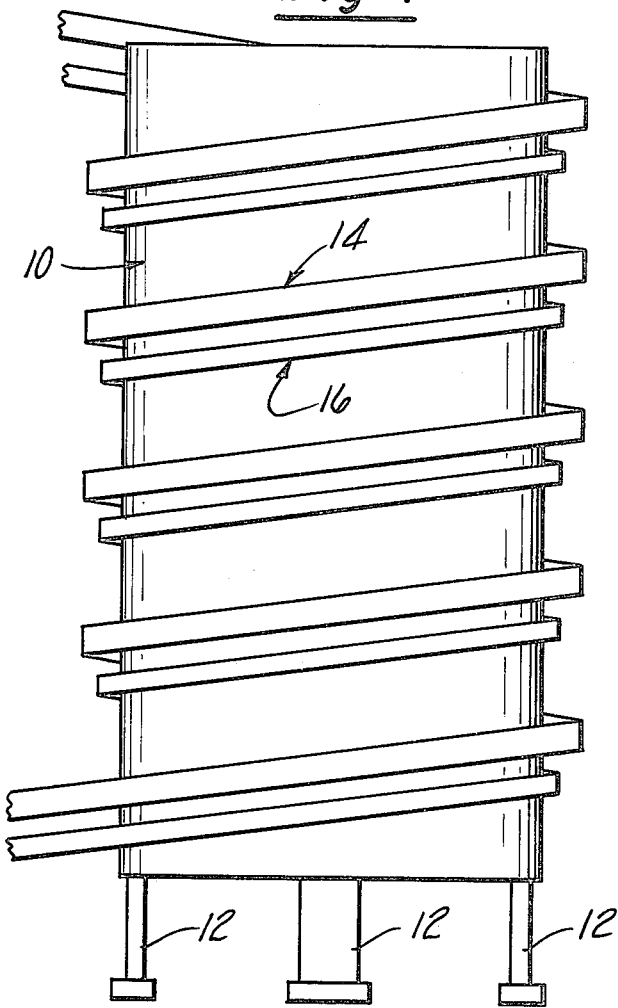
FIG. 1 is a diagrammatic view of a typical powered helical storage unit.
Figure 2:
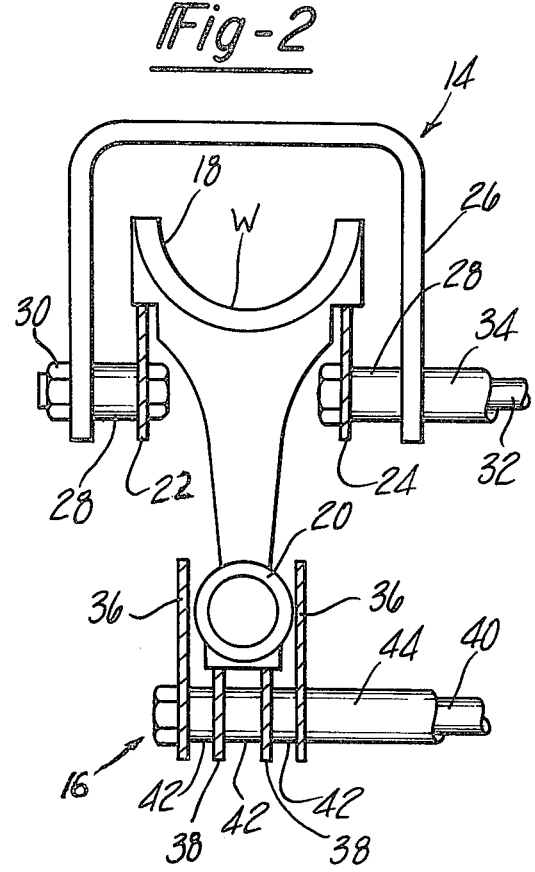
FIG. 2 is a sectional view through the two guideways of a storage unit embodying this invention and showing a typical workpiece.
Figure 6:
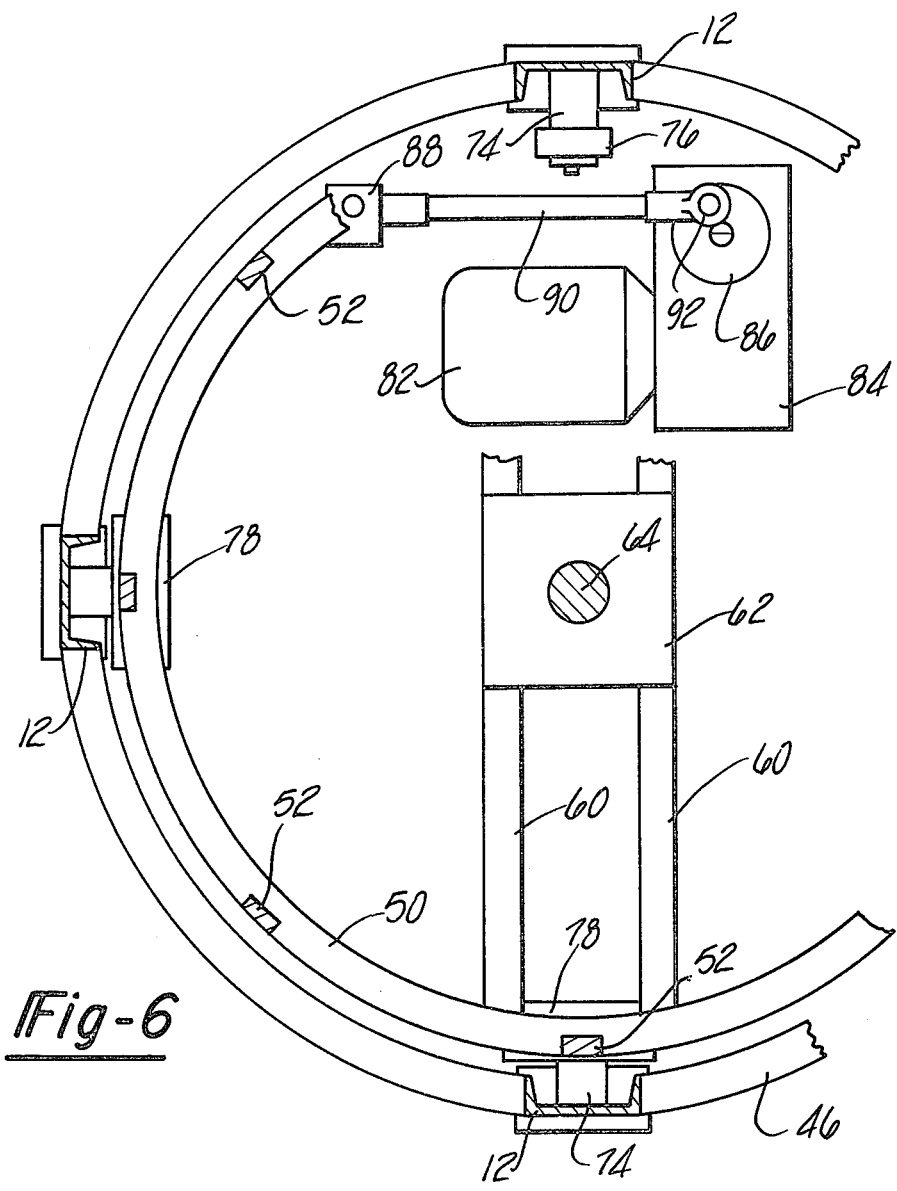
FIG. 6 is a fragmentary sectional view along the line 6—6 in FIG. 5.
Figure 7:
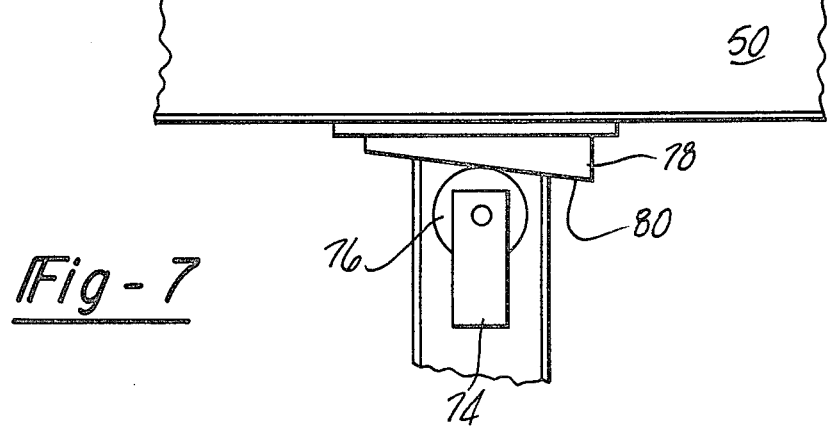
FIG. 7 is a fragmentary view along the line 7—7 in FIG. 5.

In FIG. 1 there is illustrated in a general way a helical storage unit of the present invention which comprises a cylindrical shell 10 supported on four vertical legs 12. Around shell 10 is wrapped a pair of parallel helical guideways 14,16. A more detailed showing of these guideways are shown in FIG. 2. A mechanism hereinafter described and shown in FIGS. 5, 6 and 7 is employed to oscillate guideway 14 through a helical stroke for causing workpieces to be advanced upwardly or downwardly in the guideways.

In FIG. 2 the workpiece W is the main portion of a connecting rod of an internal combustion engine and is typical of the type of workpieces adapted to be handled by the storage unit of this invention. The connecting rod comprises an enlarged head 18 at its upper end and a wrist pin bearing portion 20 at its lower end. Guideway 14 comprises a pair of helical carrier rails 22,24 adapted to engage the head of the workpiece W. These two carrier rails are interconnected by an inverted U-shaped saddle strap 26. Rail 22 is mounted on strap 26 by spacer 28 and bolt and nut assembly 30. Rail 24 is mounted on strap 26 by spacer 28 and bolt and nut assembly 32 by means of which guideway 14 is mounted on shell 10. Strap 26 is properly located in radially spaced relation to shell 10 by spacer 34. The lower guideway 16 comprises a pair of spaced guide rails 36 and carrier rails 38 spaced apart on a bolt and nut assembly 40 by spacers 42. Bolt 40 is mounted on the hereinafter described helically oscillating assembly of the storage unit and rails 36,38 are spaced therefrom by a spacer 44.

Figure 3:
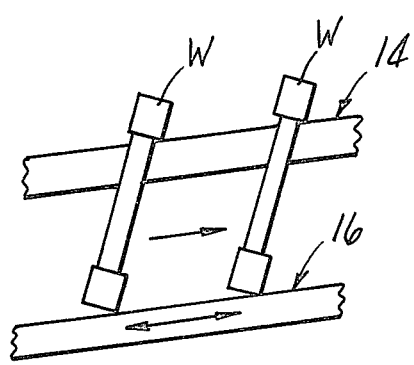
FIGS. 3 and 4 are diagrammatic views showing the progression of a workpiece along the guideways in response to movement of the bottom guideway.
Figure 4:
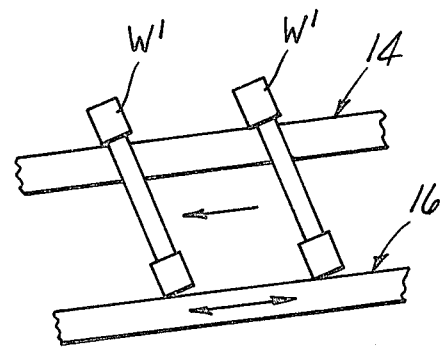

The manner in which workpieces W are advanced along guideways 14,16 is illustrated in a generally diagrammatic way in FIGS. 3 and 4. When the workpiece is arranged on the guideway so that it is inclined in the direction of the upward inclination of the guideway as shown in FIG. 3, helical oscillation of guideway 16 causes the workpiece to travel upwardly along the guideways. More specifically, when guideway 16 travels to the right, the workpieces are carried on it to the right, sliding on guideway 14. When guideway 16 travels to the left it slides under the workpieces while they cling to guideway 14; this successive oscillation will advance the workpiece to the right and up the helical guideways. When the workpieces are arranged on the guideway so that they are inclined in the direction of the downward inclination of the guideway as shown in FIG. 4 helical oscillation of the lower guideway 16 causes the workpieces to travel downwardly along the guideway. The downward inclination of the workpiece W' in FIG. 4 is used when the storage unit is loaded at the top and unloaded at the bottom.

Figure 5:
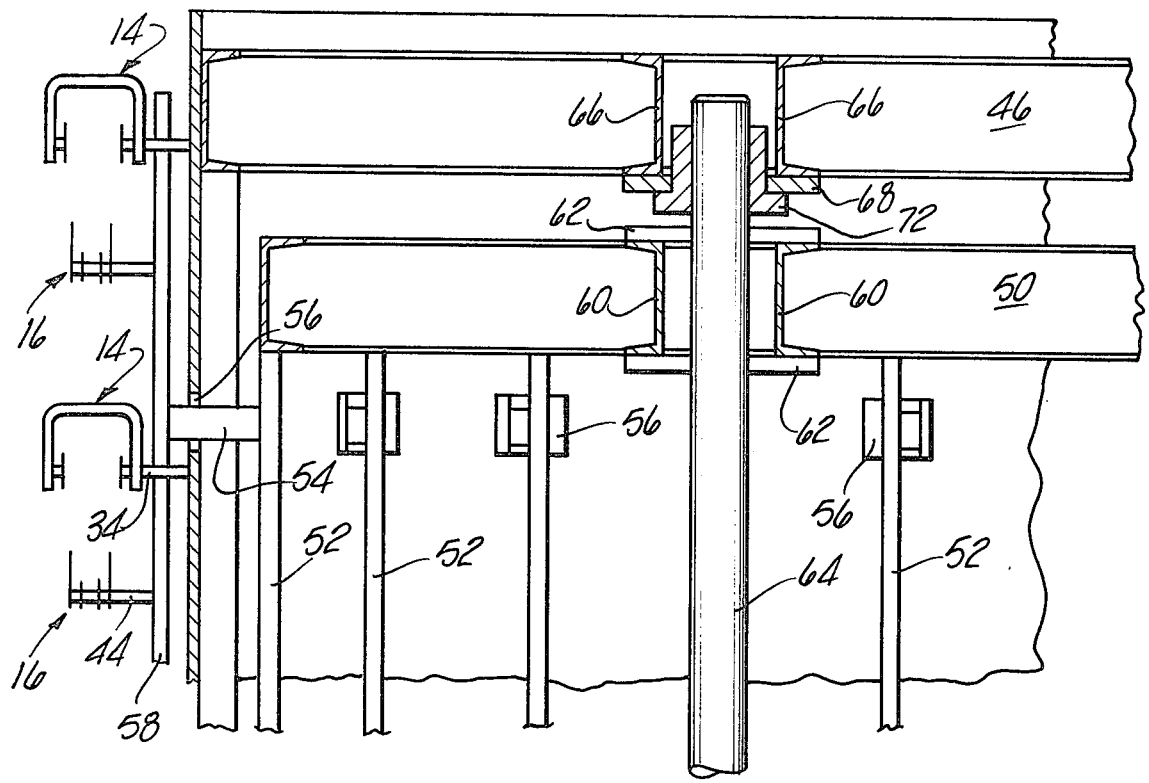
FIG. 5 is a fragmentary vertical sectional view of a powered helical storage unit incorporating the present invention.
Figure 5:
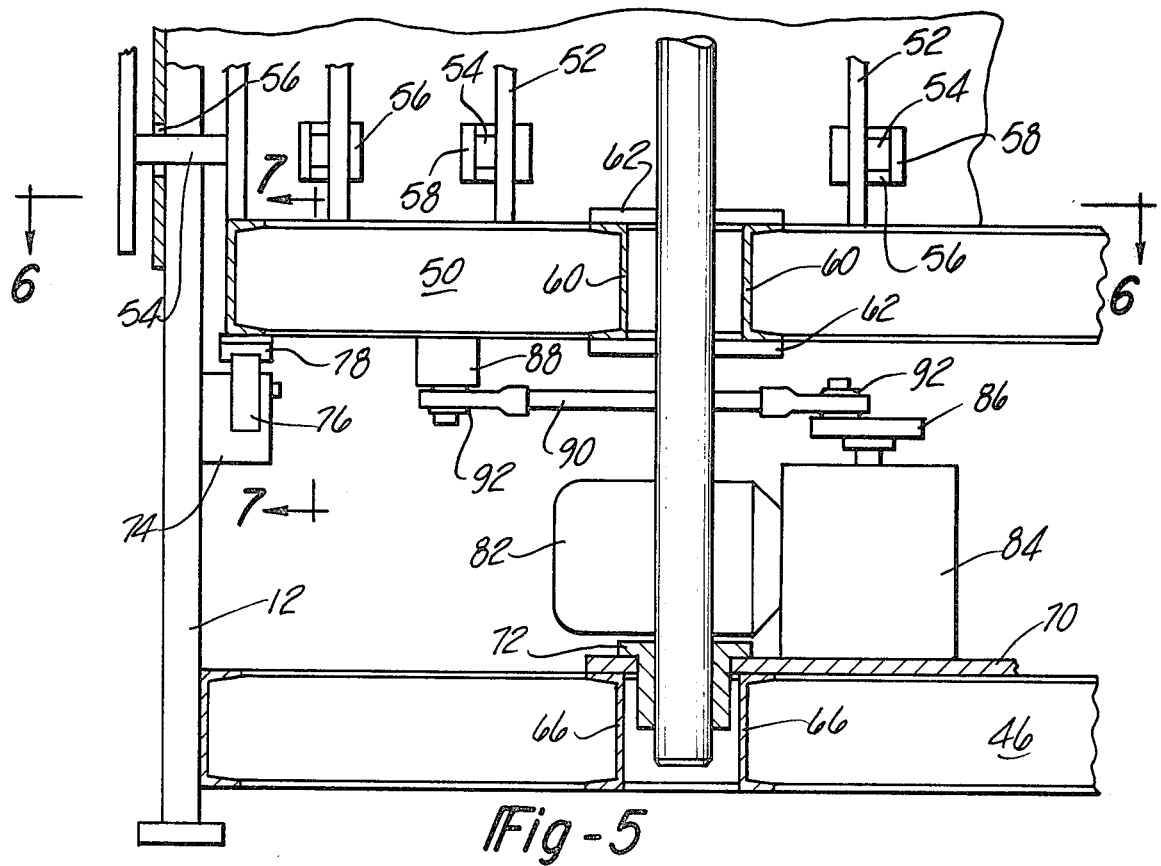

FIG. 5 illustrates the detailed construction of the storage unit embodying this invention. The upright legs 12 may be formed as channels arranged in circular fashion and spaced apart circumferentially 90°. They are retained in this position by two channel-shaped circular rings 46 to which the cylindrical shell 10 is secured to form a rigid support structure. The bolts 32 and spacers 34 extend radially outwardly from shell 10. Only two convolutions of guideways 14,16 are shown in FIG. 5, but it will be appreciated that in practice the number of convolutions of these helical guideways will be sufficient to satisfy the needs of a particular installation. In the embodiment illustrated legs 12 extend the full height of the storage unit. It will be appreciated that these legs can be short and the portions thereof extending between rings 46 may be formed as separate members.

The inner vertically oscillating support assembly on which the lower guideways 16 are mounted comprises a plurality of vertically extending columns 52 that have their upper and lower ends rigidly secured to rings 50. Columns 52 are spaced apart circumferentially generally uniformly. Each column 52 has fixedly secured thereto at vertically spaced points a plurality of support brackets 54 which extend radially outwardly therefrom through slots 56 in shell 10. Vertically extending support bars 58 are fixedly attached to the outer ends of support brackets 54. The bolts 40 which support the lower guideways 16 are mounted on support bars 58, guideways 16 being properly positioned relative to support bars 58 by spacers 44.

Both rings 50 have a pair of channel members 60 spanning their diameter as shown in FIGS. 5 and 6. Channel members 60 in each pair are joined together near their center by plates 62 that are fixed to a central post 64 that extends substantially from the bottom of the top of the storage unit. Both rings 46 also have a pair of channel members 66 spanning their diameter which are connected at the center thereof by a supporting plate 68 at the top and a supporting plate 70 at the bottom. Post 64 is guided at the top and bottom for rotary and vertical sliding movement by bushings 72 that are secured in plates 68,70.

On each of the legs 12 there is secured a radially inwardly extending bracket 74 on which a roller 76 is supported for rotation. The lower ring 50 has secured to its lower face four equally spaced wedges 78; each wedge 78 has a downwardly facing cam surface 80 which is inclined to the horizontal at the same angle as the helical guideways 14,16. Wedges 78 and the movable structure on which they are mounted are supported on the rollers 76.

The power for the unit is derived from a motor 82 which drives a gear reducer 84 mounted on plate 70. The output shaft of gear reducer 84 comprises a crank 86. Crank 86 is connected to a block 88 on the lower side of the lower ring 50 by means of a connecting rod 90. The opposite ends of connecting rod 90 are connected to block 88 and crank 86 by spherical bearings 92.

When motor 82 is operated rings 50 and the guideway 16 supported thereby will be oscillated angularly by crank 86. Since the cam faces 80 of wedges 78 are inclined to the horizontal at the same angle as the helical guideways 14,16, it follows that the angular displacement of wedges 78 will impart a helical oscillation to the guideways 16 which will be substantially parallel to the helical angle of guideway 14. Thus, the axial spacing of guideways 14,16 will remain constant and the magnitude of oscillation is not limited by the size of the workpieces. The magnitude of oscillation is controlled exclusively by the throw of crank 86 which can be selected to give a stroke to the movable guideways 16 that is adequate to deliver the required number of workpieces per unit of time.

It will be noted that, since guideways 14,16 remain uniformly spaced apart at all times, the stroke of the movable guideway is not limited by the size of the workpiece or its angle of inclination, which does not change. Depending upon the nature of the workpiece being conveyed, the upper edges of the carrier rails of the movable guideway 16 may be formed or suitably treated to provide sufficient friction to advance the workpieces on the forward stroke of guideway 16 and prevent their retrograde movement when it retracts.

I claim:

1. A helical storage and conveying unit comprising means forming a first upright support having a helical guideway extending vertically thereon about the central vertical axis of the support, means forming a second upright support having a helical guideway extending vertically thereon about the central vertical axis of the second support, said axes being coincident, the convolutions of said two guideways being vertically aligned, inclined in parallel relation and alternately spaced apart vertically a predetermined distance, means for imparting rotary oscillatory movement to one of said supports about said central vertical axis and for simultaneously vertically reciprocating said one support relative to the other such that the guideway on said one support is moved in a helical path substantially parallel to the guideway on the other support and said vertical spacing between vertically adjacent sections of the two guideways remains substantially constant.

2. A helical storage and conveying unit as called for in claim 1 wherein said vertical reciprocating means comprise interengaged cam and cam follower means.

3. A helical storage and conveying unit as called for in claim 2 wherein one of said cam and cam follower means is mounted on one of said support and the other is fixed on the other support.

4. A helical storage and conveying unit as called for in claim 3 wherein said cam means comprise wedges and said cam follower means comprise rollers engaging said wedges.

5. A helical storage and conveying unit as called for in claim 4 wherein said wedges have a wedge face inclined parallel to the helix angle of said guideways, said rollers engaging said wedge faces.

6. A helical storage and conveying unit as called for in claim 5 wherein said rollers are mounted on said fixed support and said wedges are mounted on said movable support.

7. A helical storage and conveying unit as called for in claim 4 wherein said means for imparting rotary oscillatory movement to the rotatable support comprises a motor-driven crank.

* * * * *